(12) United States Patent
Wilson-Jones et al.

(10) Patent No.: US 11,667,322 B2
(45) Date of Patent: Jun. 6, 2023

(54) STEERING COLUMN ASSEMBLY

(71) Applicant: ZF Automotive UK Limited, Solihull (GB)

(72) Inventors: Russell Wilson-Jones, Stratford upon Avon (GB); Timothy Buttery, Halesowen (GB); Mark Anthony Wilkes, Birmingham (GB); Sebastian Granville-Edmunds, Leamington Spa (GB)

( * ) Notice: Subject to any disclaimer, the term of this patent is extended or adjusted under 35 U.S.C. 154(b) by 0 days.

(21) Appl. No.: 17/534,910

(22) Filed: Nov. 24, 2021

(65) Prior Publication Data
US 2022/0185359 A1 Jun. 16, 2022

(30) Foreign Application Priority Data

Dec. 14, 2020 (GB) .................................. 2019700.0

(51) Int. Cl.
*B62D 1/183* (2006.01)
*B62D 1/181* (2006.01)
*B62D 1/184* (2006.01)
*B62D 6/10* (2006.01)
*B62D 15/02* (2006.01)

(52) U.S. Cl.
CPC ............ *B62D 1/183* (2013.01); *B62D 1/181* (2013.01); *B62D 1/184* (2013.01); *B62D 6/10* (2013.01); *B62D 15/0215* (2013.01)

(58) Field of Classification Search
CPC ........ B62D 1/183; B62D 1/181; B62D 1/184; B62D 6/10; B62D 15/0215; B62D 5/006; B60R 25/02
See application file for complete search history.

(56) References Cited

U.S. PATENT DOCUMENTS 11,318,981 B1 * 5/2022 Weselý ................ B62D 1/185
2016/0375926 A1 12/2016 Lubischer et al.
(Continued)

FOREIGN PATENT DOCUMENTS

CN 110001752 A 7/2019
CN 112550426 A * 3/2021 ............. B62D 1/183
(Continued)

*Primary Examiner* — Drew J Brown
(74) *Attorney, Agent, or Firm* — Kristin L. Murphy

(57) ABSTRACT

A steering column assembly is disclosed that comprises: an elongate rotatable steering column, a displacement motor, a torque feedback motor; an engagement mechanism and a control. The steering column is configured at one end for attachment of a steering member and is displaceable along its longitudinal axis between a withdrawn, stowed position in which the steering function of the steering column is inhibited and an extended, deployed position in which the steering function of the steering column can be enabled. The displacement motor displaces the steering column between the stowed and deployed positions. The torque feedback motor is connected to the steering column and by which the steering column is rotatable. The engagement mechanism is engaged when the steering column is in the stowed position and limits the angular displacement of the steering column to a predetermined value. A control is configured to control the operation of the displacement motor and torque feedback motor and to inhibit and enable the steering function of the steering column.

25 Claims, 14 Drawing Sheets

(56) References Cited

U.S. PATENT DOCUMENTS

2019/0226561 A1    7/2019  Magnus
2020/0172145 A1    6/2020  Hirschfeld et al.
2022/0032988 A1*   2/2022  Geiselberger .......... B62D 1/183

FOREIGN PATENT DOCUMENTS

| CN | 114435459 A * | 5/2022 | ............. B62D 1/183 |
| DE | 102018127098 B3 | 11/2019 | |
| DE | 102019112875 A1 | 11/2020 | |
| DE | 202019005512 U1 | 1/2021 | |
| DE | 102020201703 A1 | 8/2021 | |
| DE | 102020205631 A1 * | 11/2021 | |
| JP | 2002193111 A | 7/2002 | |

\* cited by examiner

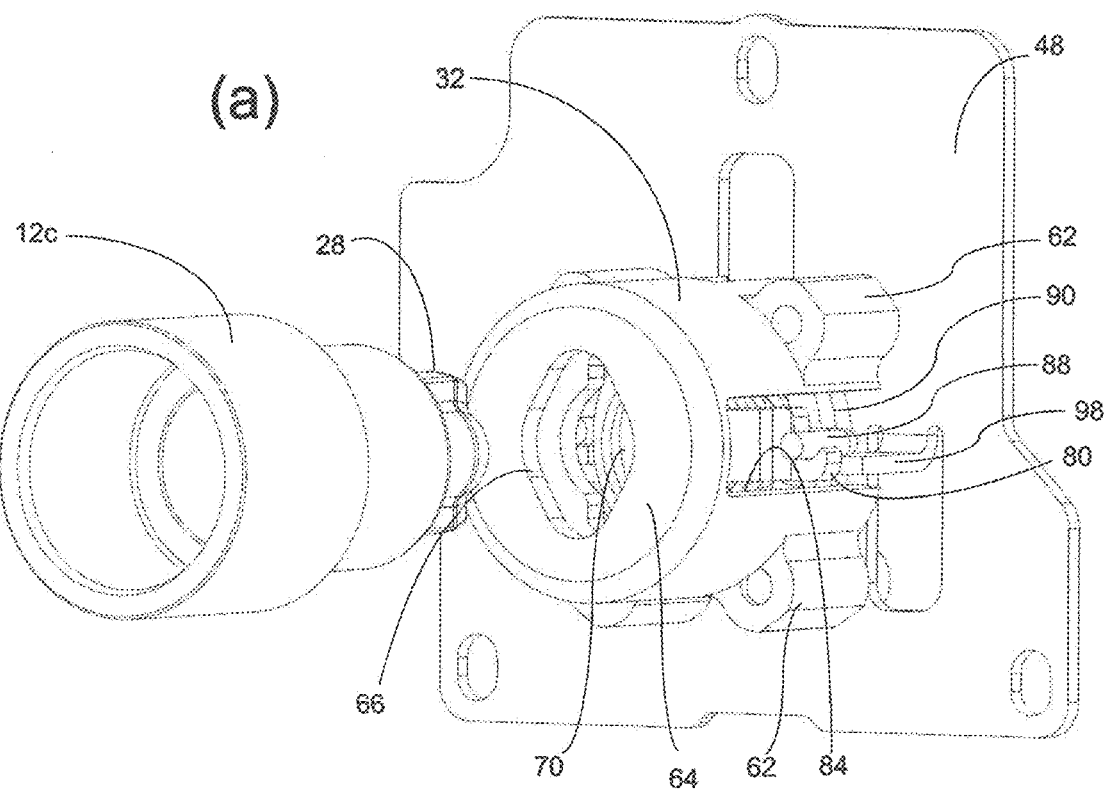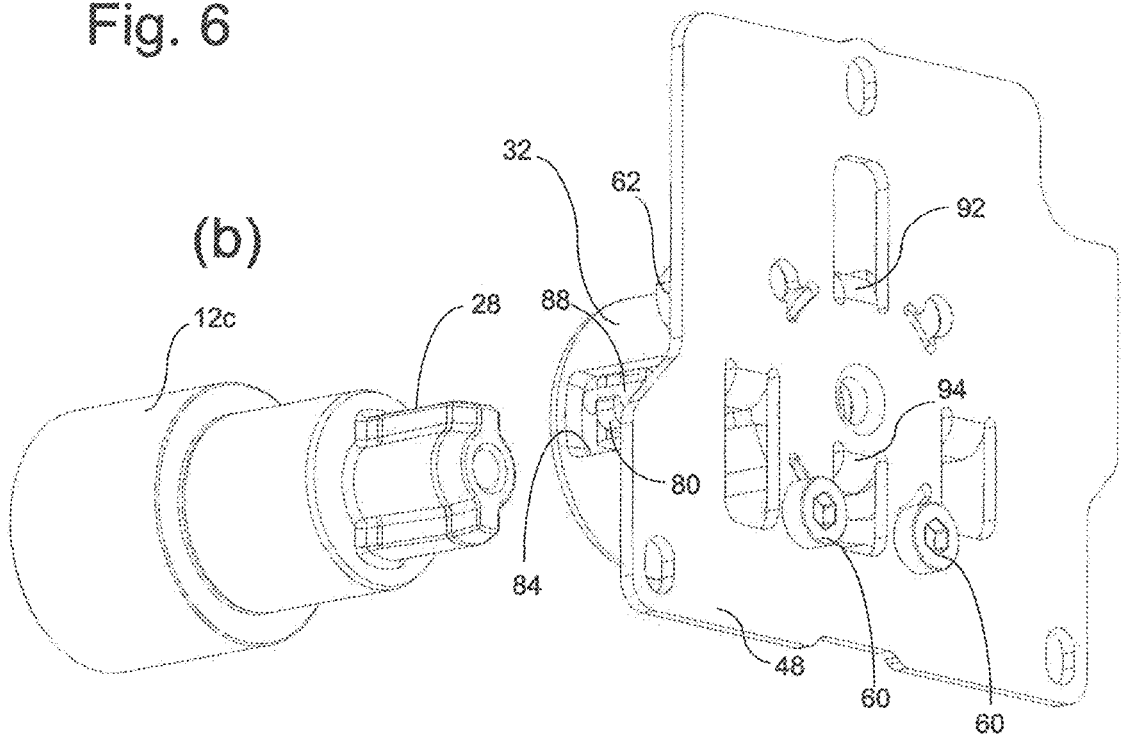
Fig. 6

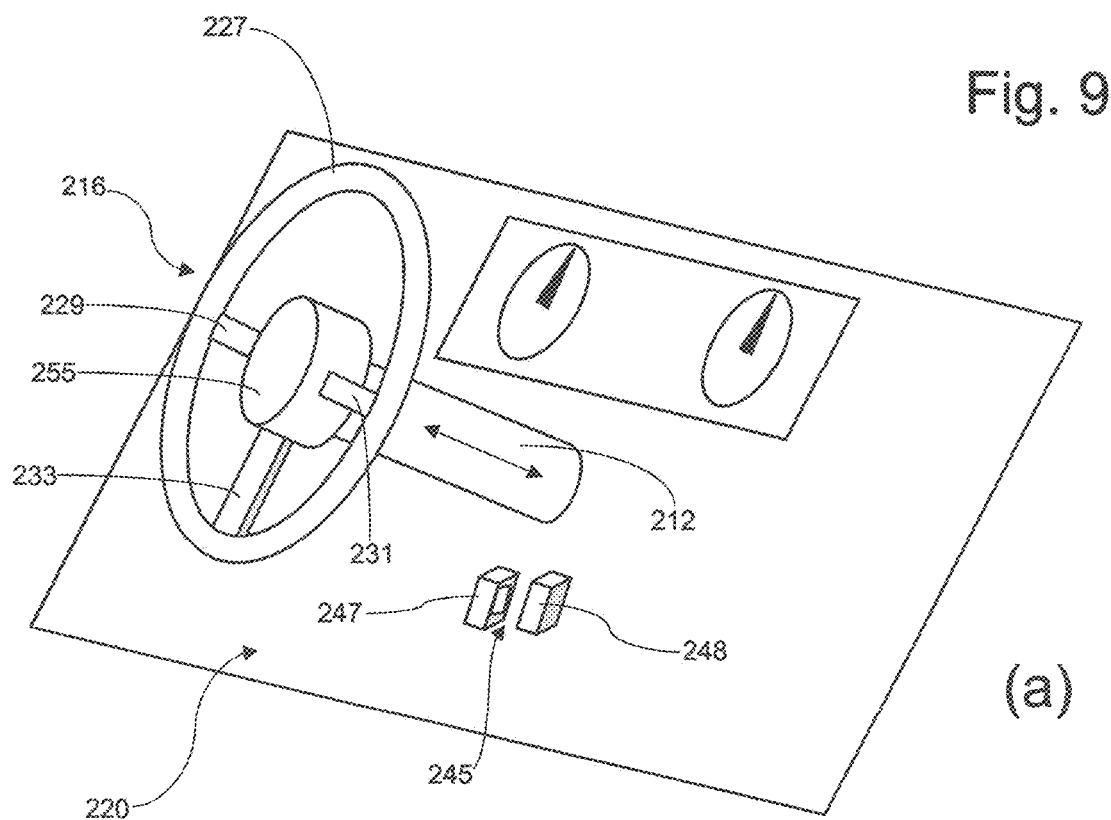
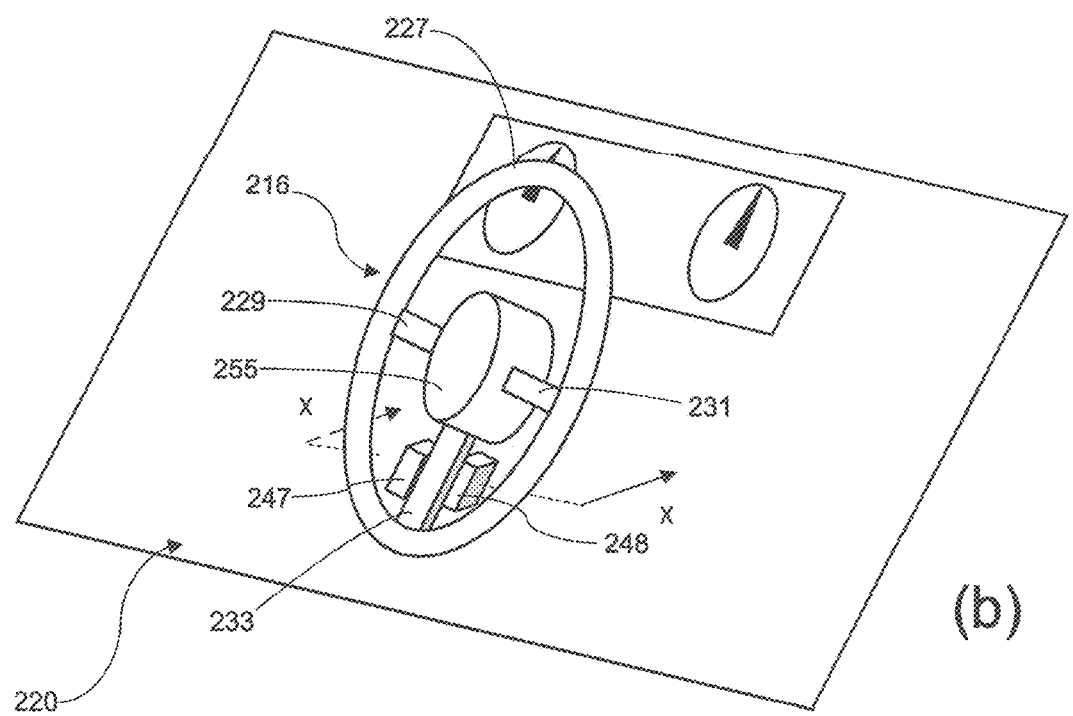
Fig. 9

STEERING COLUMN ASSEMBLY

This application claims priority to UK Patent Application No. 2019700.0, filed Dec. 14, 2020, the disclosure of which is incorporated herein by reference in its entirety.

TECHNICAL FIELD

The present disclosure relates to steering column assemblies for motor vehicles and in particular, but not exclusively, to retractable steering column assemblies for autonomous vehicles.

BACKGROUND

Autonomous vehicles are intended to be used primarily in autonomous mode, in which control of the vehicle is carried out without manual intervention. However, it is desirable for autonomous vehicles to be controllable manually if necessary or desired, and for that reason vehicle controls such as a steering wheel (typically having a "steer-by-wire" operation) must be provided. It is desirable for the steering wheel of such autonomous vehicles to be moved into a stowed condition during autonomous control of the vehicle in order to maximise the space available within the vehicle, and for the steering wheel to be moved into an extended, deployed condition for manual control.

In known steering column assemblies, a steering wheel (or other steering member such as a handlebar or tiller) is attached to one end of an elongate steering column. The angular displacement of the steering column as determined by the rotation of the steering wheel is measured to generate a signal which is used to control one or more actuators in order to adjust the orientation of the steered wheels of the vehicle as a function of the position of the steering wheel. As there is no physical connection between the steering wheel and the steered wheels of the vehicle, the steering column is also connected to an electric motor (known as a torque feedback unit) in order to provide a sensation of road feel to the driver.

Typically, the longitudinal position of the steering column is adjustable (to allow so-called "reach adjustment") by an electric motor and the rake of the steering column may also be adjusted by a further electric motor.

The measurement of the angular displacement of the steering column; the generation of the control signal for the steered wheels of the vehicle and the operation of the electric motor(s) to adjust the reach and/or rake of the steering column are controlled by an electronic control unit (ECU) which is in turn connected to the vehicle power supply and a data bus.

It is desirable that the reach adjustment of the steering column allows the steering wheel and steering column to be retracted away from the driver into a stowed position to allow easy access to and from the vehicle driving seat and when the vehicle is being driven in an autonomous mode.

What is also needed is a mechanism to prevent the steering wheel and steering column from rotating when it is not needed for manual driving of the vehicle.

SUMMARY

In accordance with a first aspect of the present disclosure, a steering column assembly comprises:

an elongate rotatable steering column configured at one end for attachment of a steering member and being displaceable along its longitudinal axis between a withdrawn, stowed position in which the steering function of the steering column is inhibited and an extended, deployed position in which the steering function of the steering column can be enabled;

a displacement motor for displacing the steering column between the stowed and deployed positions;

a torque feedback motor connected to the steering column and by which the steering column is rotatable;

an engagement mechanism which is engaged when the steering column is in the stowed position and which limits the angular displacement of the steering column to a predetermined value; and a control mechanism that is configured to control the operation of the displacement motor and torque feedback motor and to selectively inhibit and enable the steering function of the steering column.

In the steering column assembly of the present disclosure, the engagement mechanism automatically limits the angular displacement of the steering column, and any steering member attached to the steering column, when the steering column is in the stowed position.

In one exemplary arrangement, the engagement mechanism comprises biasing device for biasing the steering column towards a predetermined position.

In one exemplary arrangement, the engagement mechanism engages with a portion of the steering column when the steering column is in the stowed position.

For example, the engagement mechanism may engage with an inner end of the steering column.

In one exemplary arrangement, the engagement mechanism has a movable portion which is complementarily-shaped with the inner end of the steering column.

In one exemplary arrangement, the movable portion is spring-biased towards the inner end of the steering column.

In one exemplary arrangement, the movable portion is rotatably mounted.

The steering column assembly may further comprise a spring configured to apply a counter-torque to the movable portion in response to rotation of the movable portion.

The spring means is configured to apply a counter-torque to the movable portion in response to rotation of the movable portion in either direction.

In another exemplary arrangement, the steering column assembly may comprise an elongate housing within which the steering column is mounted and an aperture in the elongate housing through which a portion of the steering column is exposed, the engagement member engaging with the steering column through the aperture in the elongate housing when the steering column is in the withdrawn, stowed position.

In one exemplary arrangement, the steering column assembly further comprises a biasing member which biases the engagement member in a direction through the aperture in the elongate housing when the steering column is in the withdrawn, stowed position.

In one exemplary arrangement, the engagement member comprises a pawl member.

The steering column assembly may further comprise a toothed portion which rotates with the steering column and which is configured to be aligned with the aperture in the elongate housing when the steering column is in the withdrawn, stowed position and which is engageable with the engagement member.

In one exemplary arrangement, the toothed portion comprises a toothed collar mounted on the steering column.

The steering column assembly may further comprise a compliant member which permits rotation of the steering column through a predetermined angle when the engagement member engages the steering column through the apertures in the elongate housing.

In one exemplary arrangement, the compliant member comprises a resiliently deformable member which is secured to, and rotates with, the steering column, and on which the toothed portion is mounted.

This arrangement allows some rotational compliance and in particular allows the steering column to be rotated through a small angle when the engagement member engages with the steering column. This results in deformation of the resiliently deformable member which in turn generates a restoring torque on the steering column in the opposite direction.

In another exemplary arrangement, the steering column assembly further comprises a steering member attached to the steering column and the engagement mechanism is configured to engage with a portion of the steering member when the steering column is in the withdrawn, stowed position.

In one exemplary arrangement, the steering member comprises an annular rim, a central hub and one or more spokes extending between the annular rim and the central hub and the engagement mechanism is configured to engage with a spoke of the steering wheel.

In one exemplary arrangement, the engagement mechanism comprises a recess configured to receive a spoke of the steering wheel.

In one exemplary arrangement, a steering column assembly is longitudinally displaceable with respect to a vehicle dashboard and the position of the recess is fixed with respect to the vehicle dashboard.

The recess may be defined between two spaced apart members.

In one exemplary arrangement, each spaced apart member further comprises an engagement portion which is spring-biased towards the recess.

The steering member may comprise a steering wheel mounted on, and rotatable with, the steering column.

The steering column assembly may further comprise a position detector for detecting the angular position of the steering column and generating an electric signal which is a function of the angular displacement.

The steering column assembly may further comprise a mechanism for initialising and checking the function of the steering angle measurement at engagement of the engagement mechanism with, and/or disengagement from, the steering column.

The steering column assembly may further comprise a mechanism for determining the torque applied to the steering column when the steering column is in the withdrawn, stowed position.

The steering column assembly may further comprise a mechanism for analyzing one or more of the torque applied to the steering column, the angular displacement of the steering column and the angular velocity of the steering column, when the steering column is in the withdrawn, stowed position.

BRIEF DESCRIPTION OF THE DRAWINGS

By way of example only, specific exemplary arrangements of the present disclosure will now be described with reference to the accompanying drawings, in which:

FIGS. 6(a) and 6(b) are perspective views from the front and rear respectively of the locking assembly of FIG. 5, in juxtaposition with the inner end of a steering column, which forms part of the steering column assembly of FIG. 2;

FIGS. 9(a) and (b) are schematic illustrations of a third exemplary arrangement of steering column assembly in accordance with the present disclosure, shown in an extended, deployed configuration and in a retracted, stowed configuration respectively;

DETAILED DESCRIPTION

Figure 1:
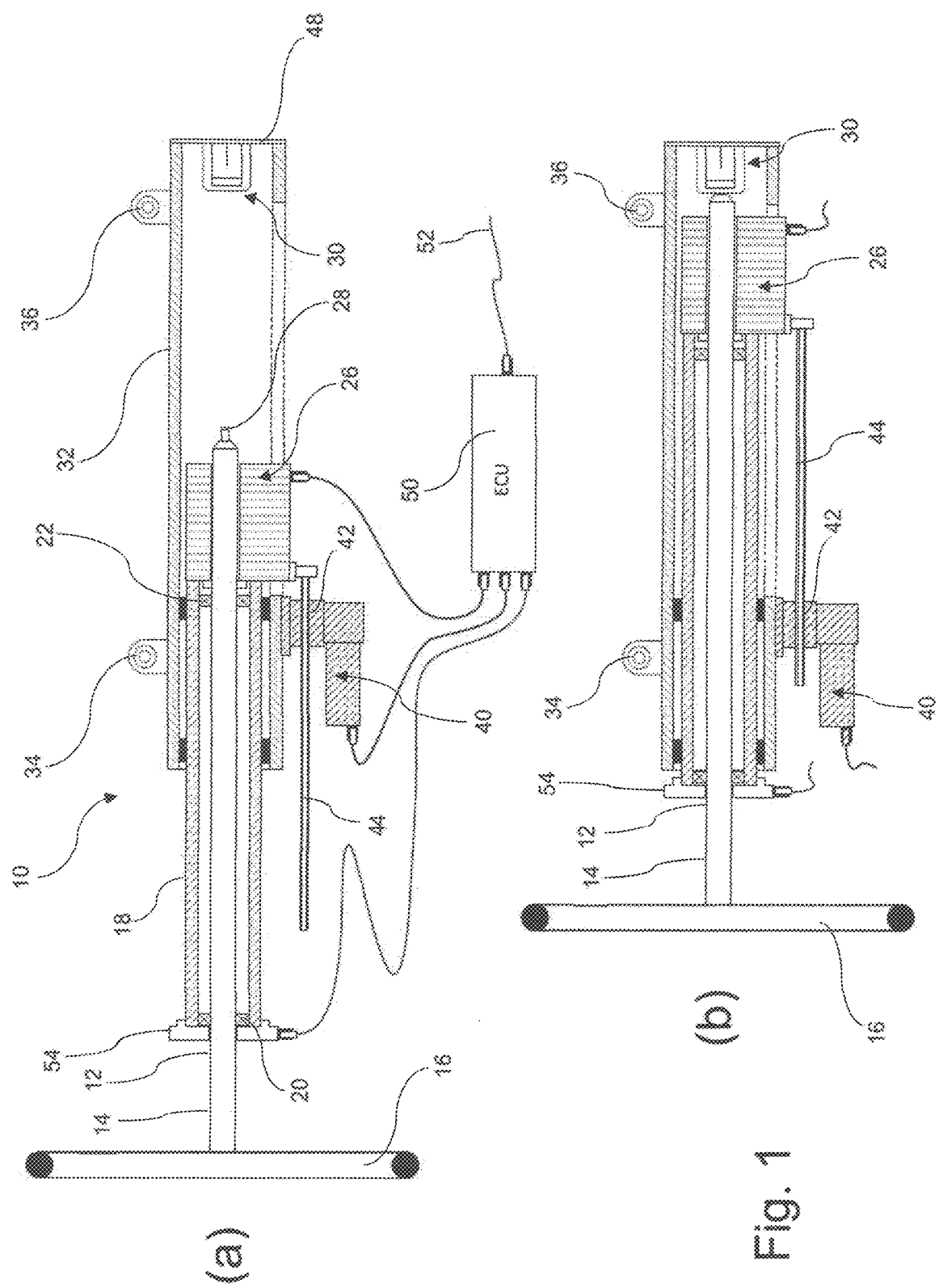
FIGS. 1(a) and 1(b) are schematic illustrations of an exemplary arrangement of steering column assembly in accordance with the present disclosure, shown in an extended, deployed configuration and a retracted, stowed configuration.

With reference to FIGS. 1(a) and (b), in one exemplary arrangement, a steering column assembly 10 for a vehicle comprises an elongate rigid steering column 12 to one end 14 of which a steering wheel 16 is connected in use. The steering column 12 is rotatably mounted within an elongate tubular steering column housing 18 by means of two spaced apart sets of bearings 20, 22. A torque feedback motor and associated gearing 26 are mounted on the steering column 12 near its inner end and the inner end of the steering column 12 is provided with a lock tooth 28 which is releasably engageable with a locking assembly 30, as will be explained.

The steering column housing 18 is slidably mounted in a fixed outer tube 32 forming an outer housing which is fixedly connected to a vehicle by front and rear mounting lugs 34, 36. The steering column housing 18 is constrained to be slidable along the longitudinal axis of the steering column 12, by which the longitudinal position of the steering wheel 16 can be adjusted (so-called "reach adjustment"). The longitudinal position of the steering column housing 18 can be adjusted by a column reach adjust motor and gearbox 40 which is configured to rotate a lead screw nut 42 which is threadedly mounted on an elongate lead screw 44 which is in turn fixedly connected to the feedback motor and gearbox 26. Since the longitudinal position of the lead screw nut 42 is fixed, rotation of the lead screw nut 42 by actuation of the reach adjustment motor 40 causes the lead screw 44 to be displaced longitudinally, which in turn results in longitudinal displacement of the steering column housing 18 and steering column 12 to which the lead screw 44 is attached.

The locking assembly 30, with which the lock tooth 28 on the inner end of the steering column 12 is releasably engageable, is mounted on a mounting plate 48 which closes off the inner end of the outer tube 32. By operation of the reach adjust motor 40, the steering column housing 18 can be displaced longitudinally between the position shown in FIG. 1(a), in which the steering column housing 18 and steering column 12 extend out of the outer tube 32 to its maximum extent and the position shown in FIG. 1(b), in which the steering column housing 18 and steering column 12 are withdrawn into the outer tube 32 to its maximum extent, in which position the lock tooth 28 is releasably engaged with the locking assembly 30, as will be explained.

The feedback motor 26 and reach adjust motor 40 are electrically connected to an electronic control unit (ECU) 50 which controls the actuation of the two motors, and which is in turn connected to a vehicle data bus 52. The ECU 50 is also connected to a conventional sensor shown schematically at 54 for measuring the angular displacement of the steering column 12 and generating an electrical signal which is supplied to the ECU 50 and used to control the orientation of these steered wheels of the vehicle as a function of the angular position of the steering column.

Figure 2:
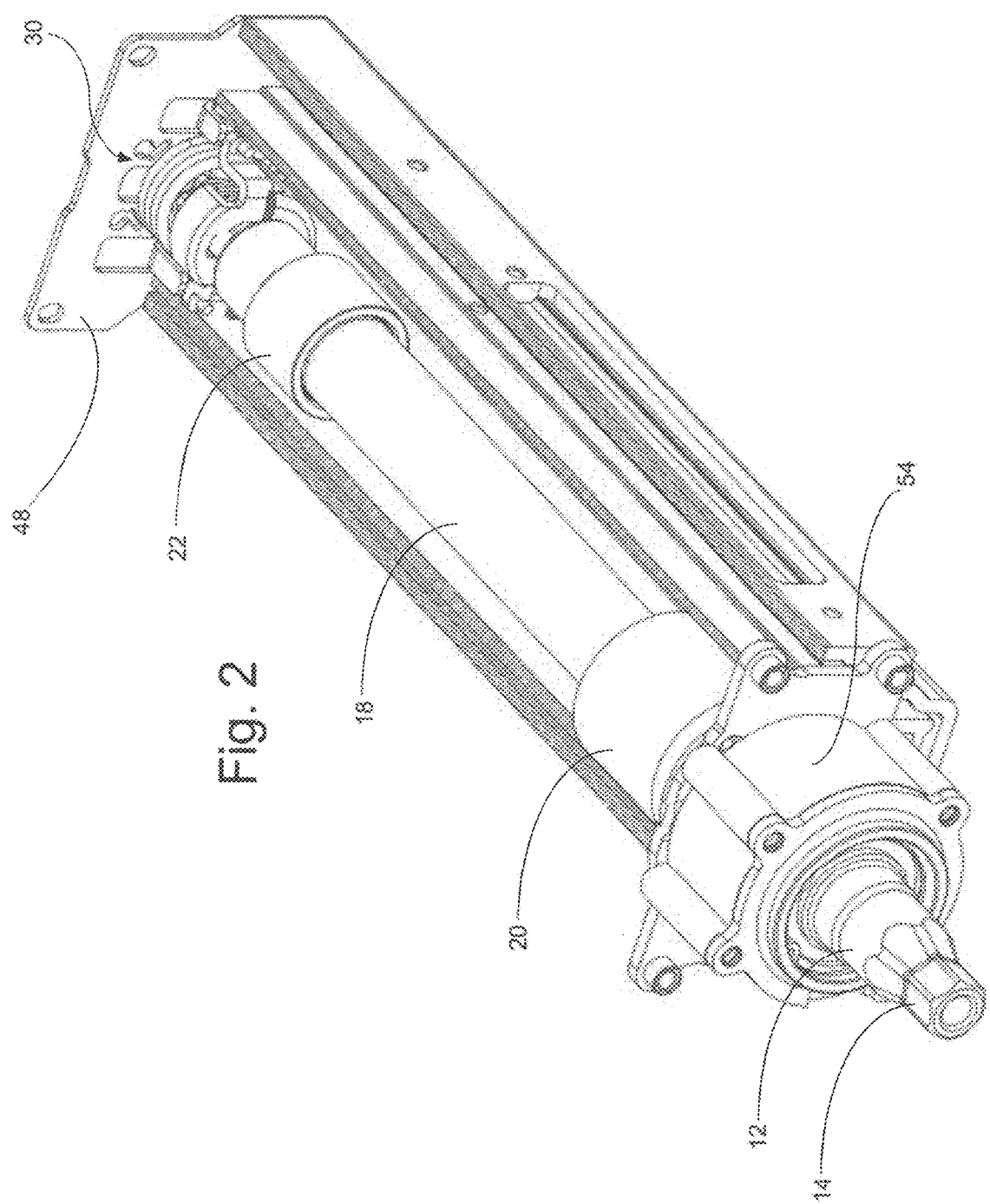
FIG. 2 is a perspective view from above of a first practical arrangement of steering column assembly in accordance with the present disclosure, shown in a retracted; stowed configuration.
Figure 3:
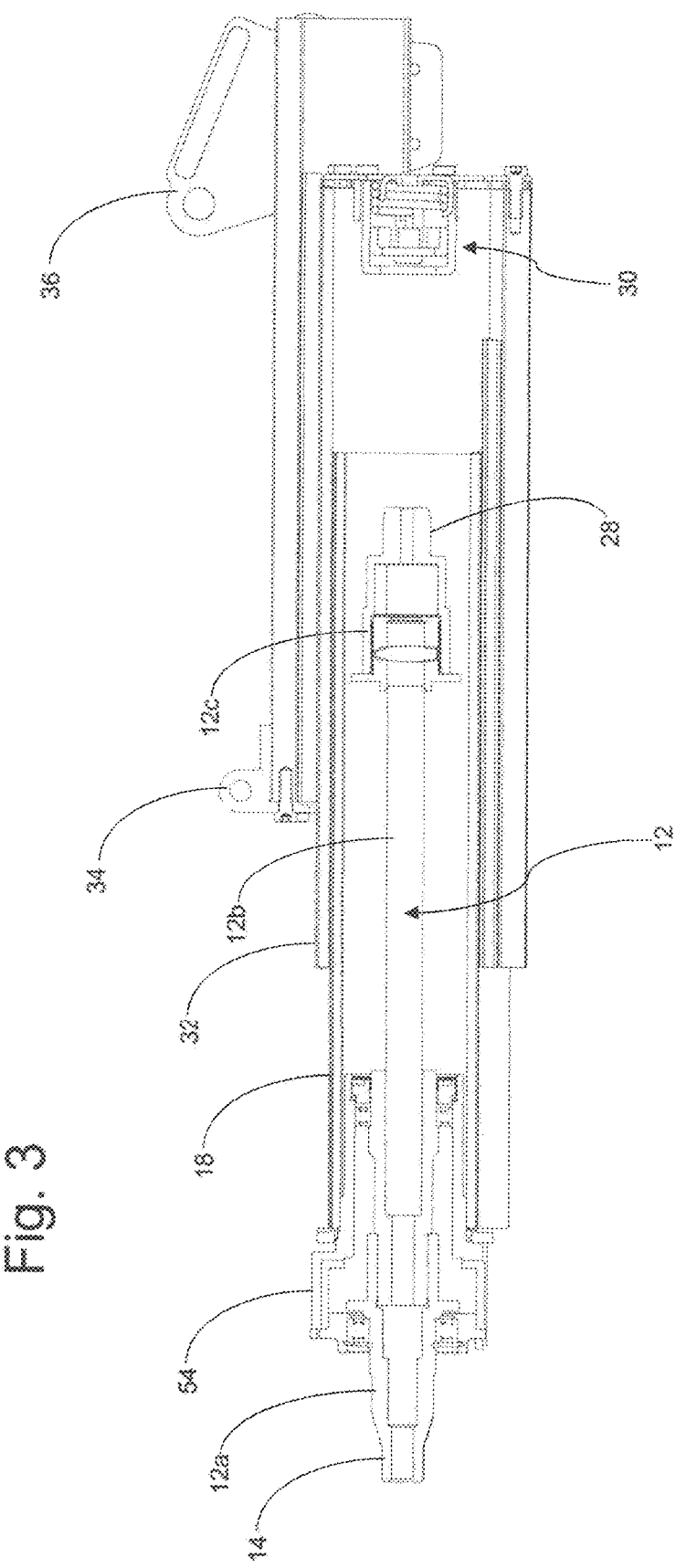
FIG. 3 is a vertical cross-section through the longitudinal axis of the steering column assembly of FIG. 2, shown in an extended; deployed configuration.
Figure 4:
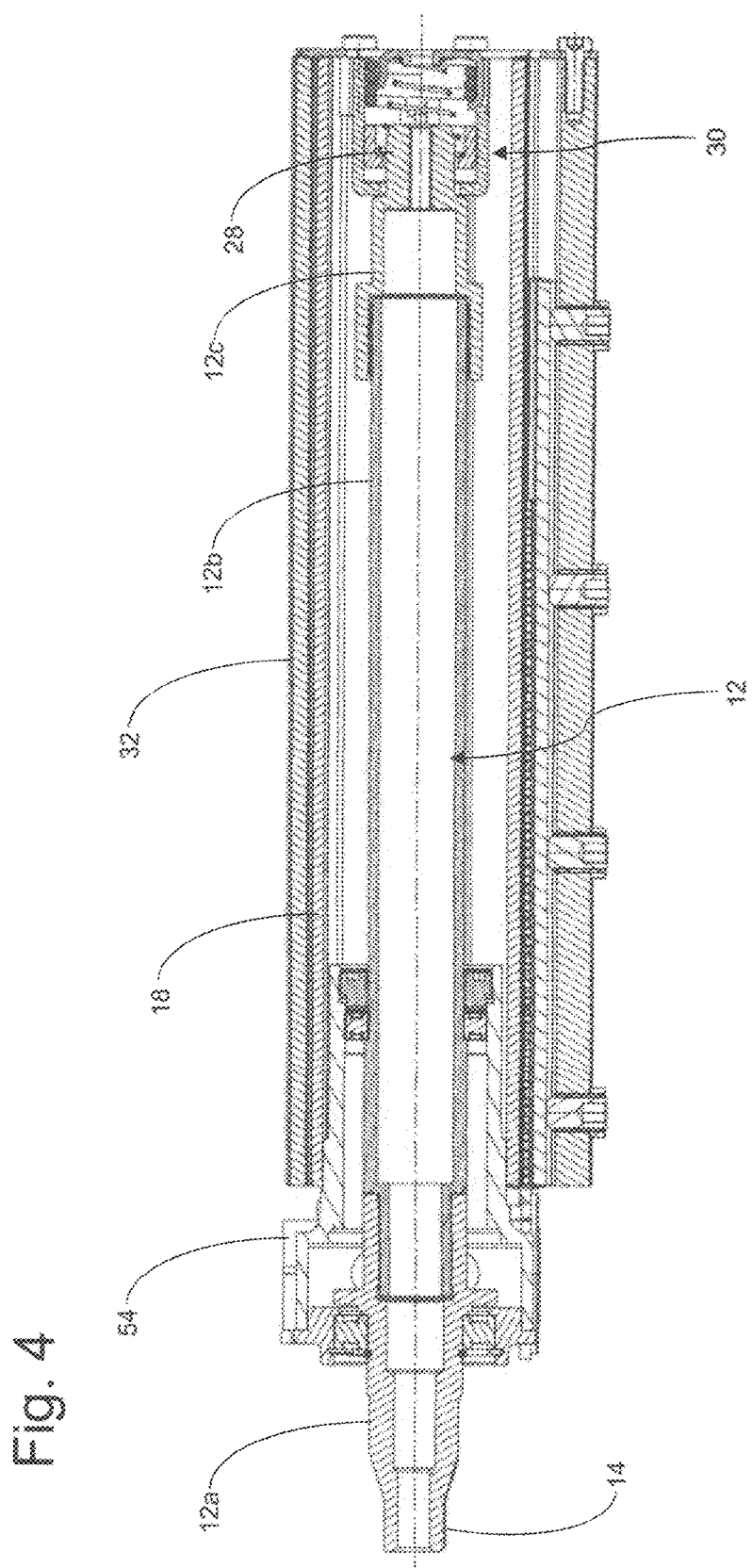
FIG. 4 is a vertical cross-section through the longitudinal axis of the steering column assembly of FIG. 2; shown in a retracted, stowed configuration.

FIGS. 2 to 4 show the steering column assembly of FIG. 1 in more detail, but omitting the steering wheel 16, torque feedback motor and gearbox 26, the reach adjust motor 40, the lead screw 44 and the ECU 50, and the same reference numerals are used to denote the same features.

Figure 5:
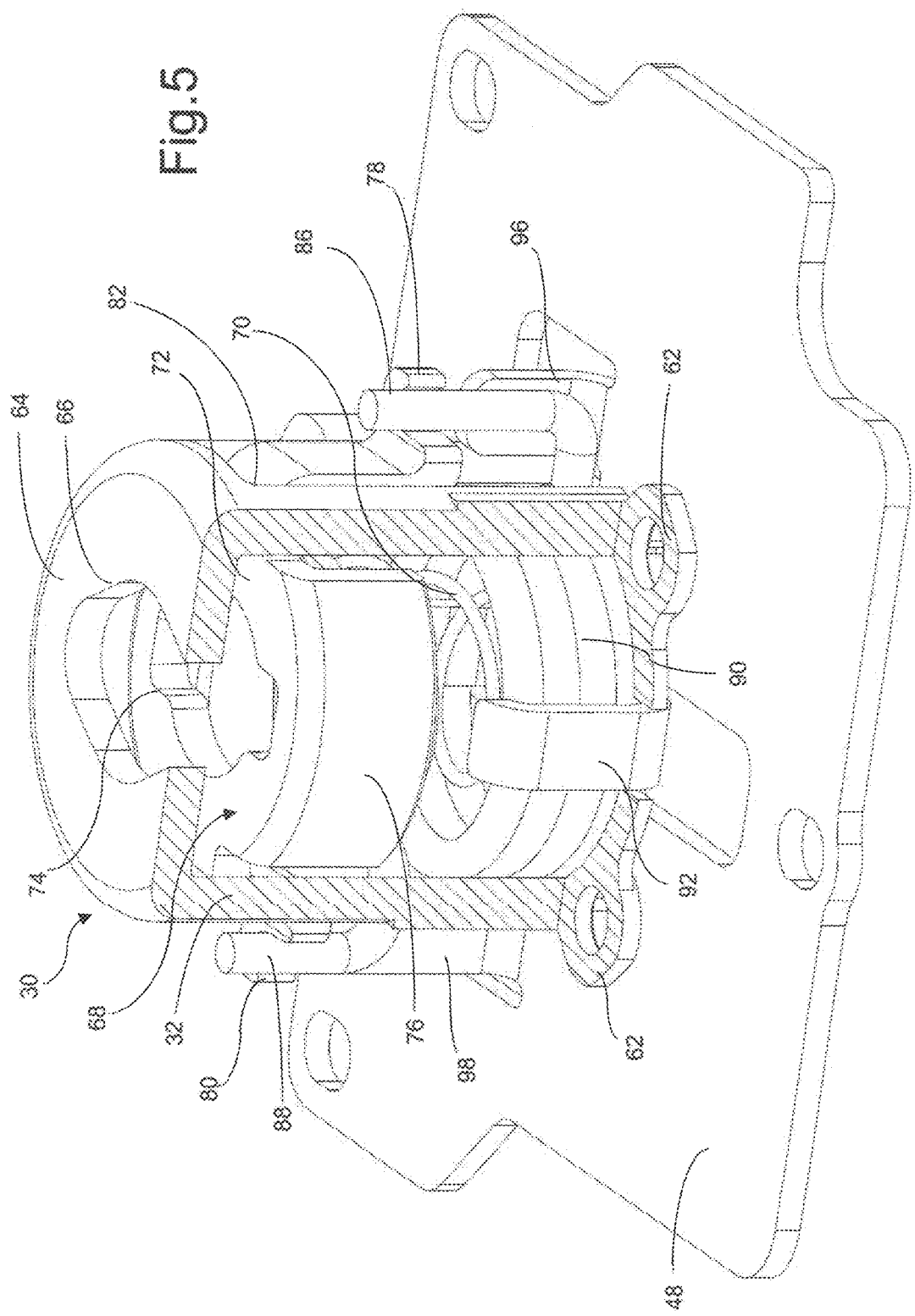
FIG. 5 is a perspective view, partly cut away, of a locking assembly which forms part of the steering column assembly of FIG. 2.

The locking assembly 30 is shown in more detail in FIGS. 5 and 6, and in one exemplary arrangement, comprises a generally tubular metal housing 32 mounted on the mounting plate 48 by four bolts 60 (two of which are shown in FIG. 6(b)) received in radially outwardly projecting threaded mounting bosses 62 equally angularly spaced around the periphery of the housing. The housing 32 is open at its lower end and is partially closed off at its upper end by means of an integrally formed end wall 64 having a centrally disposed lozenge-shaped aperture 66 shaped and sized to receive the lock tooth 28 on the end of the steering column 12.

A rotor 68 formed from pressed metal is located within the housing 32 and is urged in the direction of the end wall 64 by an engagement spring 70. The rotor 68 is formed from a disc-shaped portion 72 having a centrally disposed slot or aperture 74 which is complementarily-shaped with, but slightly oversized with respect to, the lock tooth 28 on the inner end of the steering column 12. A pair of diametrically opposed curved flanges 76 extend perpendicularly with respect to the disc-shaped portion 72 to provide a recess or pocket for receipt of the upper end of the engagement spring 70.

The rotor 68 is also provided with two diametrically opposed radially extending rotor arms 78, 80, each of which passes through a respective one of two diametrically opposed slots 82, 84 in the wall of the housing 32 and engages a respective upwardly projecting portion 86, 88 extending from a respective end of a torsion spring 90 mounted at the base of the housing 32 and which surrounds, and is coaxial with, the engagement spring 70. The torsion spring 90 is retained at the base of the housing 32 by means of diametrically opposed tangs 92, 94 pressed out of the base plate 48 and two further tangs 96, 98 pressed out of the base plate form spring stops which limit the rotation of the upwardly projecting portions 86, 88 of the torsion spring 90 in the anticlockwise and clockwise directions respectively (when viewed from above as seen in FIG. 5).

As visible in FIGS. 3 and 4, the steering column 12 is formed from a number of components secured together, namely a tubular main section 12a, a tubular front end section 12b and a tubular inner end cap 12c, the distal end of which is formed into the lock tooth 28. When the steering column 12 is displaced into its retracted, stowed position as illustrated in FIGS. 1(b), 2 and 4, if the steering column 12 is in the straight ahead (zero rotation) position, the lock tooth 28 will pass through the lozenge-shaped aperture 66 in the end 64 of the housing 32 (best seen in FIG. 5) and will then be received in the slot or aperture 74 in the rotor 68. The engagement spring 70 provides a bias on the rotor 68 to push it towards the end wall 64 of the housing and ensures that the lock tooth 28 immediately engages the rotor after the lock tooth 28 has passed through the aperture 66 in the housing. As the steering column 12 retracts and the tooth 28 engages with the rotor, the engagement spring 70 will press the rotor into contact with the tooth 28 on the steering column. If the tooth 28 is not aligned with the rotor, it will press on the upper face of the rotor and compress the engagement spring 70. If the steering column is rotated in this state, the engagement spring 70 will ensure that the rotor is engaged with the tooth 28 when they are angularly aligned. It should also be noted that the apertures 66 and 74 are oversized with respect to the lock tooth 28, to facilitate engagement of the lock tooth 28 and the rotor when they are not in exact angular alignment.

When the lock tooth 28 is engaged with the rotor 68, any angular movement of the steering column 12 will also rotate the rotor 68 within the housing 32. The angular movement in either direction is opposed by the torsion spring 90 up to the point where the respective rotor arm 78, 80 is limited by engagement with the periphery of its associated slot 82, 84 in the housing 32. As the rotor is rotated by the lock tooth 28 on the end of the steering column 12, one of the rotor arms 78, 80 will engage with its associated end of the torsion spring 90. The torsion spring 90 reacts with that rotor arm 78, 80 and the opposite spring stop 98, 96 in the bracket 48 and thus imposes a torque between the steering column 12 and the fixed part of the locking assembly 30. If the rotor 68 is rotated in the opposite direction, the opposite rotor arm 80, 78 will engage with the torsion spring 90 and the torque will act in the opposite direction on the steering column 12. The angular movement of the rotor 68 is constrained by the two slots 82, 84 in the housing 32 that prevent over travel of the rotor arms 78, 80. When the rotor arms 78, 80 contact the walls of the slots 82, 84 in the housing, the torque is transmitted directly into the housing 32 and hence into the non-rotating part of the steering column.

Figure 7:
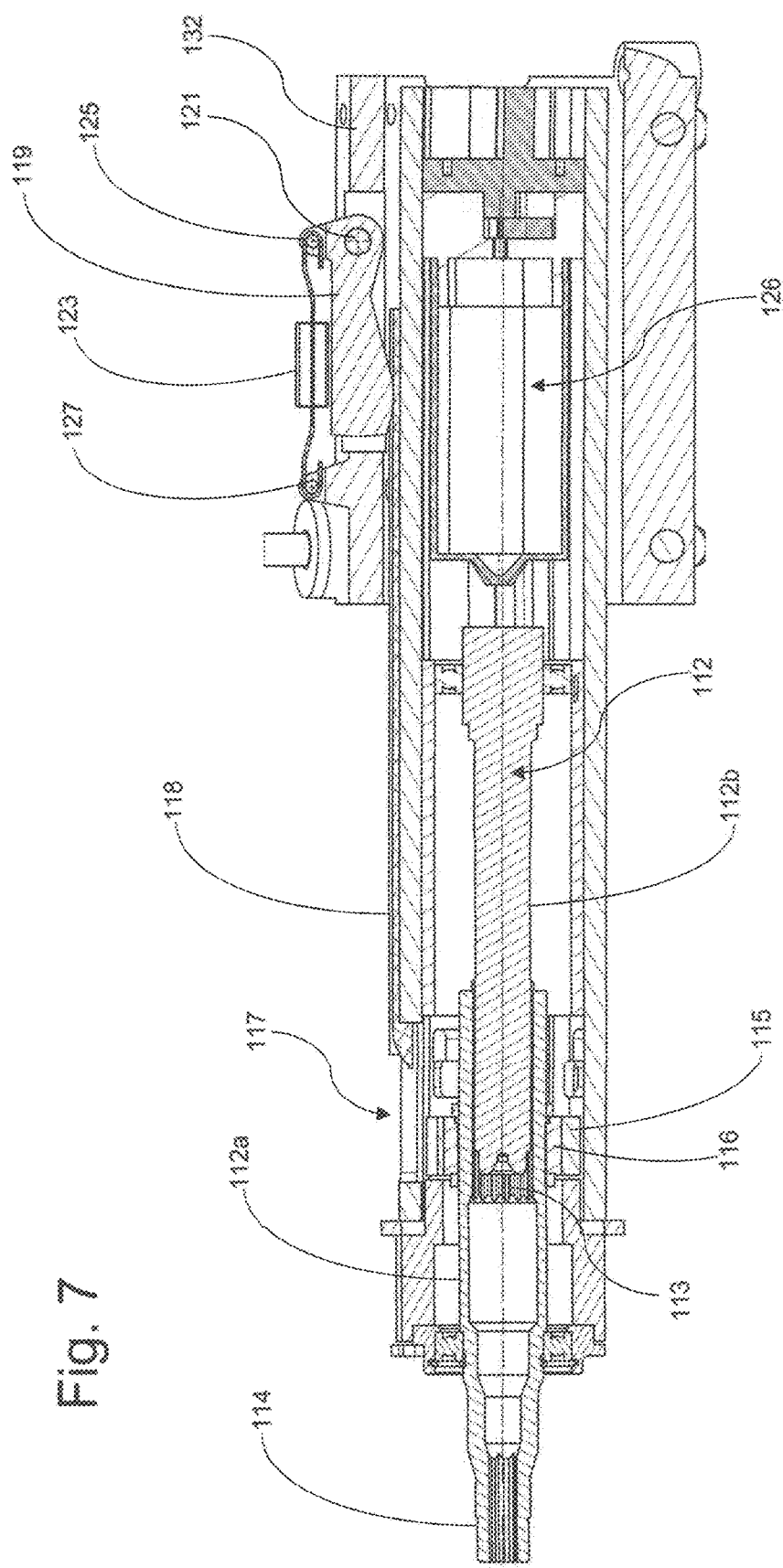
FIG. 7 is a vertical cross-section through the longitudinal axis of a second exemplary arrangement of steering column assembly in accordance with the present disclosure, shown in an extended, deployed configuration.
Figure 8:
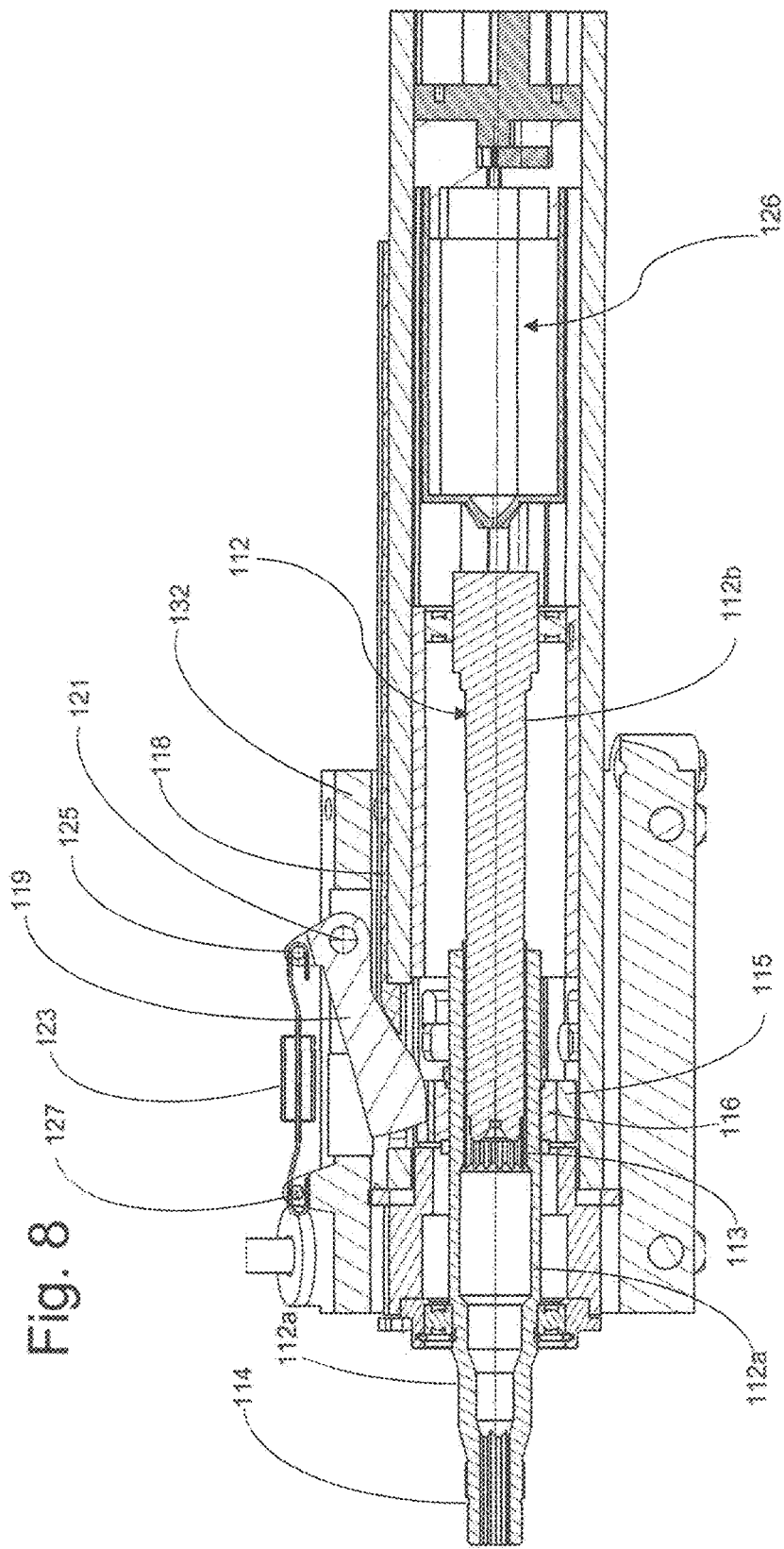
FIG. 8 is a vertical cross-section through the longitudinal axis of the steering column assembly of FIG. 7; shown in a retracted, stowed configuration.

A second exemplary arrangement of the present disclosure is illustrated in FIGS. 7 and 8 in which the locking assembly 30 of the first exemplary arrangement is replaced by a pawl mechanism which engages with the steering column 12 when the steering column is in a withdrawn, stowed position.

The steering column assembly illustrated in FIGS. 7 and 8 comprises an elongate rigid steering column 112 to one end 114 of which a steering wheel (not shown) is connected in use. The steering column 112 is rotatably mounted within an elongate tubular steering column housing 118 and a torque feedback motor and associated gearing 126 are mounted on the steering column 112 near its inner end.

The steering column housing 118 is slidably mounted in a fixed outer tubular housing 132 which in use is fixedly connected to a vehicle. The steering column housing 118 is constrained to be slidable along the longitudinal axis of the steering column 112, by means of which the longitudinal position of the steering wheel can be adjusted (so-called "reach adjustment"). The longitudinal position of the steering column housing 118 can be adjusted such as that shown in the first exemplary arrangement, namely a column reach adjust motor and gearbox which is configured to rotate a lead screw nut which is threadedly mounted on an elongate lead screw which is in turn fixedly connected to the feedback motor and gearbox, but those details have been omitted from FIGS. 7 and 8 for simplicity and clarity.

It will be observed that the steering column 112 comprises an outer, generally tubular portion 112a which receives one end of a solid cylindrical portion 112b by a splined connection 113. A toothed annular collar 115 is secured to be mounted on the tubular portion 112a of the steering column 112 at a position which approximates to the outer end of the cylindrical portion 112b of the steering column. The collar 115 is not mounted directly onto the steering column 112, but instead is mounted on a rubber annular collar 116 which is itself fixedly mounted on the outer face of the tubular portion 112a of the steering column, for example by a keyed connection. The outer annular collar and inner annular collar 116 are constrained to rotate together by means of teeth on the inner annular face of the outer collar 115 which engage with complementary teeth on the outer annular face of the inner rubber collar 116, but the inner rubber collar 116 allows some torsional compliance to a predetermined degree and provides a sprung resistance to angular deflection of the steering column 112, as will be explained. As seen in FIGS. 7 and 8, a window 117 is provided in one side of the housing adjacent to the collar 115.

A pawl member 119 is pivotally mounted to the outer tubular housing 132 at pivot 121 and is spring loaded towards engagement with the steering column housing 118 by a torsion spring 123 extending between lugs 125, 127 on the pawl member 119 and housing 132 respectively, by which the end of the pawl remote from the pivot 121 is biased towards engagement with the outer surface of the steering column housing 118.

When the steering column 112 is in an extended, deployed position as shown in FIG. 7, for example, the pawl member 119 is biased by the spring 123 into engagement with the outer surface of the steering column housing 118. However, when the steering column 112 is withdrawn into its retracted, stowed position illustrated in FIG. 8, the spring 123 causes the pawl member 119 to pivot downwardly through the window 117 in the steering column housing 118 and into engagement with the toothed collar 115 on the steering column 112. If the pawl is not angularly synchronised with a slot in the collar, then it will spring into a slot in the collar 115 when the steering column 112 is rotated.

Engagement of the pawl 119 with the toothed outer collar 115 fixes the rotational position of the collar 115. However, since the outer collar 115 is mounted on the rubber inner collar 116 which is secured to the steering column 112, it is still possible for the steering column to be rotated through a small angle when the pawl is engaged with the outer collar 115. In addition, any rotation of the steering column when the pawl is engaged with the outer lock collar 115 will be counteracted by a restoring torque in the opposite direction because of the resilient deformation of the inner rubber collar 116.

The extent to which the steering column 112 can be deflected when the pawl is engaged with the outer lock collar 115 can be determined by selection of the material and dimensions of the inner rubber collar 116.

Figure 10:
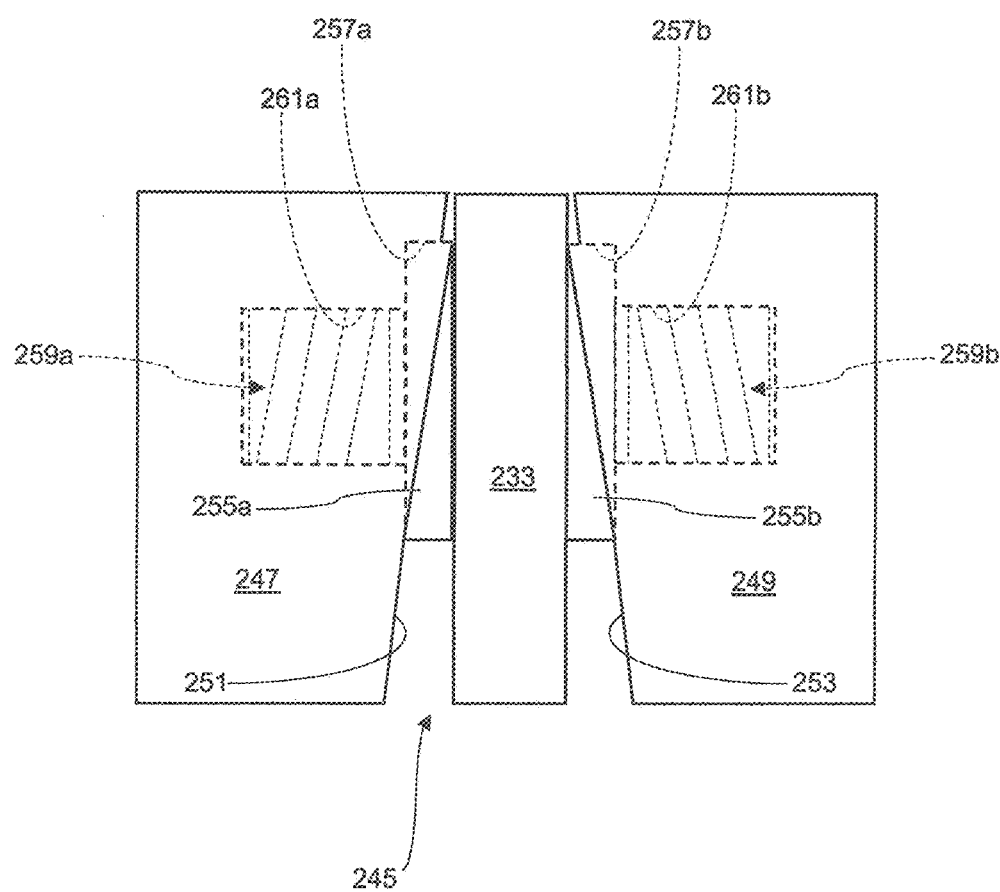
FIG. 10 is a cross-sectional view through a portion of the steering column assembly of FIG. 9, to an enlarged scale, looking in the direction of arrows X-X in FIG. 9.

A third exemplary arrangement of the present disclosure is illustrated in FIGS. 9 and 10. The figures illustrate a steering wheel 216 which is connected to one end of a steering column 212 which extends from a dashboard 220 of a vehicle. The position of the steering column, and therefore of the steering wheel, is adjustable between an extended, deployed position shown in FIG. 9(a) and a retracted, stowed position shown in FIG. 9(b). The mechanism for adjusting the position of the steering column and steering wheel is known but is not visible in the figures.

The steering wheel 216 has a central hub 225, an annular rim 227 and spokes 229, 231, 233 extending between the hub and rim at the 9 o'clock, 3 o'clock and 6 o'clock positions, although other steering wheel configurations could be used, including a different number of spokes and different positions of the spoke or spokes.

When the steering column 212 and steering wheel 216 are in the retracted, stowed position shown in FIG. 9(b) and the steering wheel 216 is in the straight ahead (zero rotation) position, the spoke 233 at the 6 o'clock position is received in a recess 245 formed between two locating blocks 247, 249 mounted on, and projecting from the front surface of, the dashboard 220. As best seen in FIG. 10, the recess 245 is slightly wider at its base than the width of the wheel spoke 233 by having the inner faces 251, 253 of the locating blocks 247, 249 which form the recess 245 flared outwardly, to guide the spoke 233 into the recess if the steering wheel 227 is not precisely in a straight ahead position.

FIG. 10 also shows that when the spoke 233 is received in the recess 245, it is engaged on opposite sides by a respective one of two identical spring-loaded contact plates 255a, 255b slidably mounted in respective recesses 257a, 257b in the locating blocks 247, 249. The contact plates 255a, 255b are biased towards the recess 245 by respective identical compression springs 259a, 259b mounted in respective recesses 261a, 261b formed in the inner faces of the locating blocks 247, 249. This arrangement allows slight rotation of the steering column 212 when it is in the withdrawn, stowed position but the spring-loaded contact plates 255a, 255b bias the steering column 212 towards the straight ahead position.

Each of the above exemplary arrangements discloses a steering column assembly which can be adjusted from an extended, deployed position to a retracted, stowed position and wherein in the retracted, stowed position it is possible for the steering column to rotate through a small, predetermined angle in either direction, but is biased towards the straight ahead position.

Figure 11:
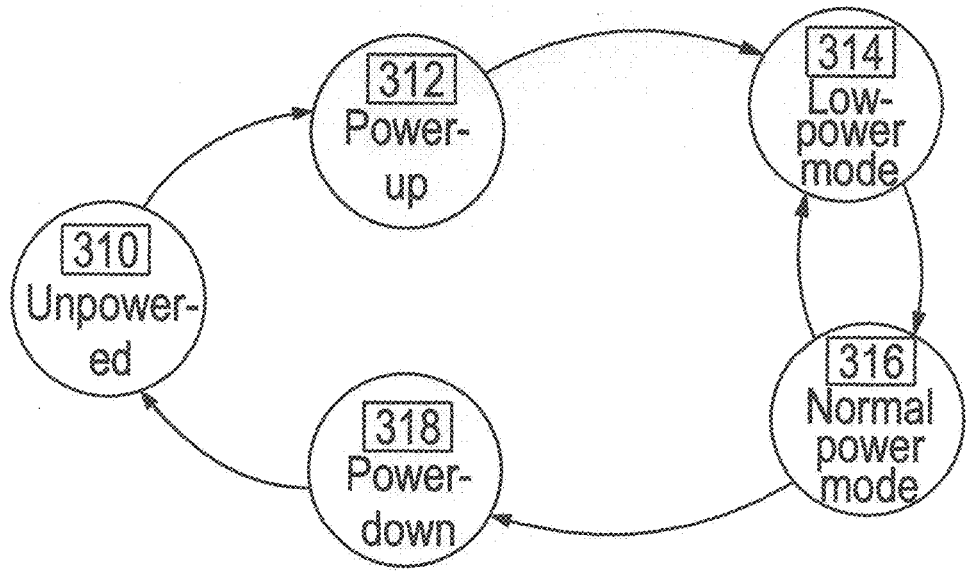
FIG. 11 is a diagram illustrating an example of the operating modes of the exemplary arrangements of the present disclosure referred to above.

FIGS. 11 to 17 Illustrate a typical operating procedure which can be used with any of the above exemplary arrangements. In one exemplary arrangement, the operating cycle preferably includes the following modes, as shown in FIG. 11:

310 Unpowered: in this state the ECU is substantially de-powered and non-operational. Low-power circuits may be used to monitor the angle of the handwheel or location of the column but most functionality is disabled.

312 Power up: in this state, the ECU starts up, performs power up built in diagnostics and initialises system functions including the control of the column location.

314 Low-power mode: in this state the ECU is powered up, reading signals from sensors, but does not provide power to the feedback or column adjust motors. The angle of the handwheel is secured by a locking device as described in the above exemplary arrangements.

316 Normal power mode: in this mode the handwheel actuator performs all of its normal functions including providing haptic feedback (e.g. simulated road feel) and controlling the column location.

318 Power down: in this state the ECU performs power down built in diagnostics and stores information in non-volatile memory (NVM).

Figure 12:
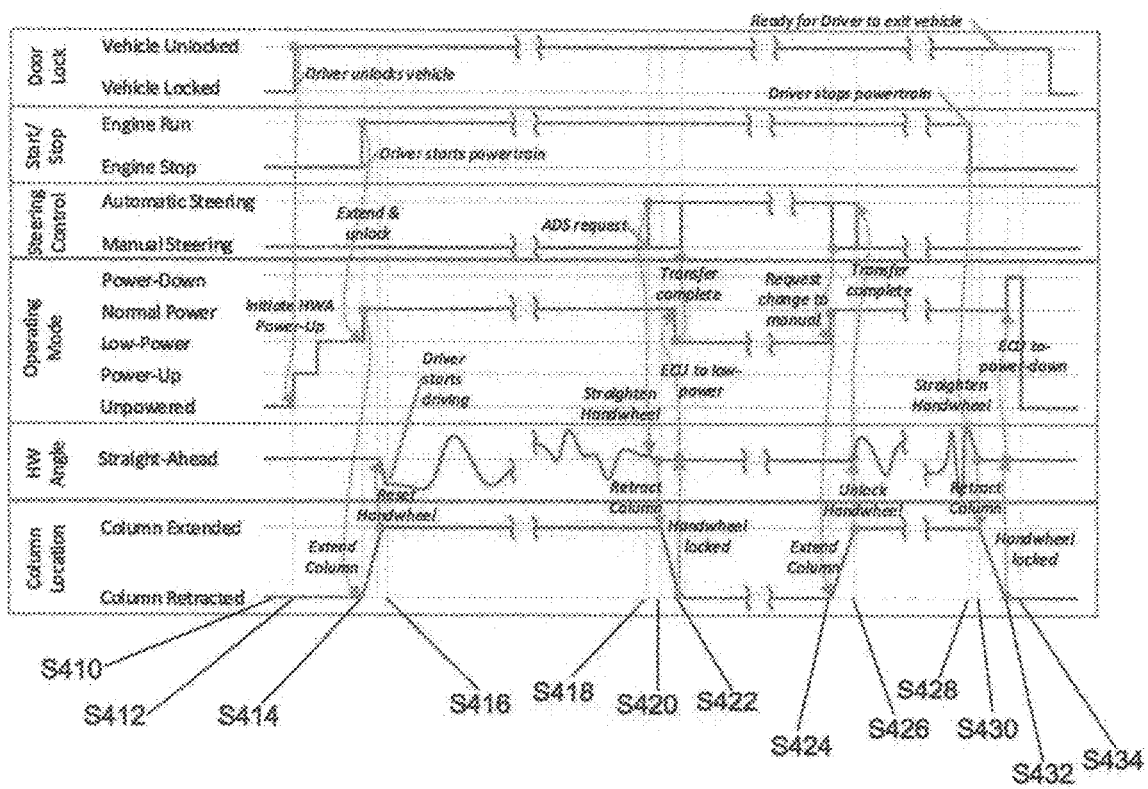
FIG. 12 is a diagram illustrating a simplified operating sequence of the exemplary arrangements of the present disclosure referred to above.

A typical operating sequence may include the following operations, as shown in a simplified form in FIG. 12:
vehicle entry and journey start
transition to automated driving
transition to manual driving
journey end and vehicle exit FIG. 12 shows a typical sequence and does not include all the interactions required to complete the operation. For example, there may be additional checks to ensure correct operation and to ensure one action is completed before starting the next. The various operations will be described in more detail below and in the Figures "step" or a point in time or a period of time is abbreviated to "S".

Vehicle Entry and Journey Start

Usually the vehicle will be left with the doors locked (S410), the handwheel locked and the steering column retracted to allow easy entry by the driver.

At S412, the driver unlocks the vehicle and the vehicle sends a signal to the ECU 50 to start the power-up process 312 (FIG. 11). Once the ECU 50 is powered-up, it waits for the driver to enter the vehicle. After the Driver has entered the vehicle, at 3414 the driver starts the powertrain operation (e.g. by switching on the ignition of the engine in an internal combustion engine (ICE)-powered vehicle).

At this point, the vehicle instructs the ECU 50 to unlock the handwheel and extend the column to the manual driving location. This may set the column reach position according to a preference stored in the ECU 50. The extension of the column releases the handwheel lock and the ECU 50 controls the angle of the handwheel to correspond to the angle of the front (steered) roadwheels. At S416 the driver can then drive the vehicle manually using the handwheel.

Transition to Automatic Driving

At some point (3418), the driver may opt to transfer control to an automated driving system. Another vehicle system will initiate the automated driving mode and take over control from the driver. After the automatic driving system is in control, the steering input from the handwheel is not required and so at S420 the vehicle will signal the ECU 50 to retract the column and at 3422 to lock the handwheel and put the ECU 50 into a low-power mode (314, FIG. 11) to minimise current drawn from the vehicle power supply.

Transition to Manual Driving

When the vehicle is in the automatic driving mode, at 3424 the driver may request to take over control. The automatic system will assess the situation and may hand over control to the driver. In this case, a request will be sent to the hand wheel actuator to deploy the handwheel. Normally, the automatic driving system will only relinquish control when the vehicle is travelling substantially in a straight-line with a near-zero small steering angle. The handwheel actuator ECU 50 will switch to the Normal Power mode, extend the column, and at S426 will unlock the steering wheel (handwheel) and set the handwheel angle to correspond with the front (steered) roadwheel angle.

Some checks on the handwheel actuator operation will be needed. After this is successfully completed, the handwheel actuator will inform the automatic driving system that it is ready for control to be passed to the driver.

Journey End and Vehicle Exit

At the end of a journey (3428), the driver will stop the vehicle and turn off the powertrain. At S430, the vehicle will request the handwheel ECU 50 to retract the column and at S432 will lock the handwheel. Once this is done, at S434 the handwheel ECU 50 can go through a power down sequence and then turn itself off (become unpowered). In parallel, the driver may exit the vehicle and then lock it. A similar sequence can occur if the vehicle is being driven automatically and the automatic driving system stops the powertrain. The operation of the exemplary arrangements will now be described in more detail.

Retraction/Extension Control

The retraction and extension of the column will have an anti-trap feature similar to power electric windows. In particular the motor current, speed and angle will be monitored. If the load exceeds the expected value, then the movement of the column will be halted until either a time has elapsed, or the Driver restarts the sequence via an HMI (human-machine interface).

Locking Sequence

In normal operation, the handwheel will be rotated to align with the lock before, or while, the column is retracting ("locking angle"). The locking angle is determined from information obtained during previous locking cycles that is stored in non-volatile memory in the ECU 50, or elsewhere in the vehicle. The ECU 50 will adjust the handwheel angle by controlling the torque from the feedback motor 26. The angular rotation speed of the handwheel will be limited to avoid striking the driver. The locking angle should normally be achieved before the column retracts to the point that the lock starts to engage. If the target handwheel locking angle cannot be achieved (e.g. because the driver is holding the handwheel) then the column retraction will be delayed until the handwheel can turn to the correct angle.

The hardware design will provide a handwheel angle measurement with enough accuracy to align the column 12 and (a) lock rotor 68 (first exemplary arrangement), (b) a recess in the toothed collar 115 (second exemplary arrangement) or (c) the recess 245 in the dashboard 220 (third exemplary arrangement). Therefore it is expected that in most circumstances the handwheel can be angularly aligned to the target locking angle before the lock is engaged.

In normal circumstances a power-down check can be performed to confirm that the steering is locked using a method similar to the power-up diagnostics described below.

If, for some reason, the handwheel and lock do not align then a re-alignment search routine will be required. This may include the following steps.

Retract the column and stop when it is fully retracted or the anti-trap/over-current limit is detected.

Determine whether the lock is engaged: for example this could be done by rotating the column with the feedback torque motor and monitoring the motor torque and column angle.

If the lock is not engaged, then use the feedback torque motor 26 to slowly rotate the handwheel. This can be done either in a constant direction or in one exemplary arrangement with an oscillating angle of increasing amplitude centred on the expected locking angle.

When the locking elements are angularly aligned the engagement spring will engage the lock and the angular movement of the handwheel will be constrained. This condition will be detected by monitoring the current and angle of the feedback torque motor 26.

When the feedback motor 26 is blocked by the lock, the feedback motor torque can be set to zero.

After the lock condition is achieved and the feedback torque set to zero, the column can be fully retracted and the new angle recorded and assessed. If the new lock angle is substantially different to the expected angle it may be necessary to implement further checks before allowing the vehicle to move. For example, the column can be partially extended and the straight-ahead angle detected by a lock-lock cycle. This can be compared with the angle of the lock to determine if it is feasible, or if the relationship between the lock angle and the straight-ahead angle needs to be changed by one revolution.

The present disclosure can also be used to implement a set of built-in functions that help to initialize and check the function of the steering angle measurement and the feedback torque motor. These built-in diagnostic checks can be implemented during both power up and power down. Typically they will be implemented at power up to ensure that the hardware is operating correctly before starting a journey. Other built-in diagnostics would normally be used in addition to check the basic operation of the feedback motor and the angle sensor. These checks may include basic plausibility checks that test electrical connections and basic operation.

Torque Cycle

Figure 13:
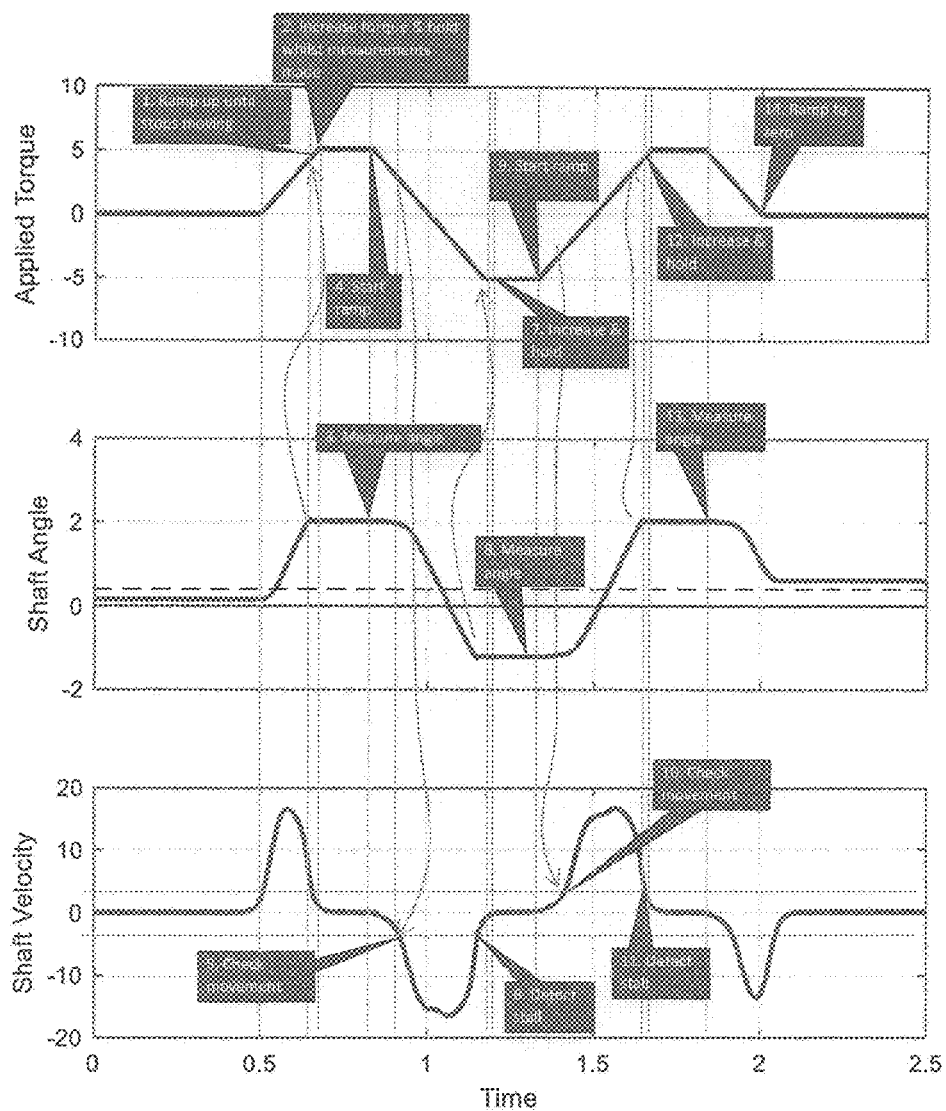
FIG. 13 comprises graphs of steering shaft velocity, angular displacement and applied torque against time in an example of a test sequence for the exemplary arrangements of the disclosure referred to above.

The first set of tests can be performed by applying a torque ramp-up/down sequence as shown in FIG. 13. Other test profiles can be used to focus on the key measurement points and reduce the amount of time; alternatively, this could be a sinusoidal wave instead of triangular, or be adapted according to the measurements made (e.g. by reversing the torque once a certain velocity threshold is crossed).

The sequence shown in FIG. 13 may be run in an open-loop fashion with a pre-determined torque profile, or it may be run in a sequence that reacts to the previous events. The sequence of events includes:

From a starting condition with no torque applied, the feedback motor 26 is controlled to progressively increase the torque. The movement of the handwheel is monitored until a stall condition is detected.

After a stall condition is detected, the applied torque is increased by a certain amount and then held at a constant level. Under normal circumstances this is expected to rotate the handwheel to one end of the lock travel against the torsion spring torque. The handwheel angle should be monitored for abnormal behaviour and the time taken for the step to be completed should be checked.

The angle of the handwheel is measured with the applied torque held constant.

The applied torque is ramped down to zero and then into the opposite direction. During this time, the handwheel is expected to move to the opposite limit of lock travel against the torsion spring.

The direction and velocity (time-taken) of the movement should be checked.

Detect the stall condition as the end of the lock travel.

Apply additional torque and hold.

Measure the handwheel angle. Note that in this example, the angle is not central and so the measured angle can offset to obtain the true angle of the handwheel.

Start ramp back to opposite lock end stop.

The direction and velocity (time taken) of the movement should be checked.

Detect the stall condition as the end of the lock travel.

Apply additional torque and hold.

Measure the handwheel angle.

Ramp the applied torque down to zero.

If the sequence does not complete as expected, then additional excitation may be applied to confirm the error or to try an alternative test profile (e.g., higher applied torque). The checks may be applied whilst the profile is being generated or after a pre-programmed profile is completed.

Figure 14:
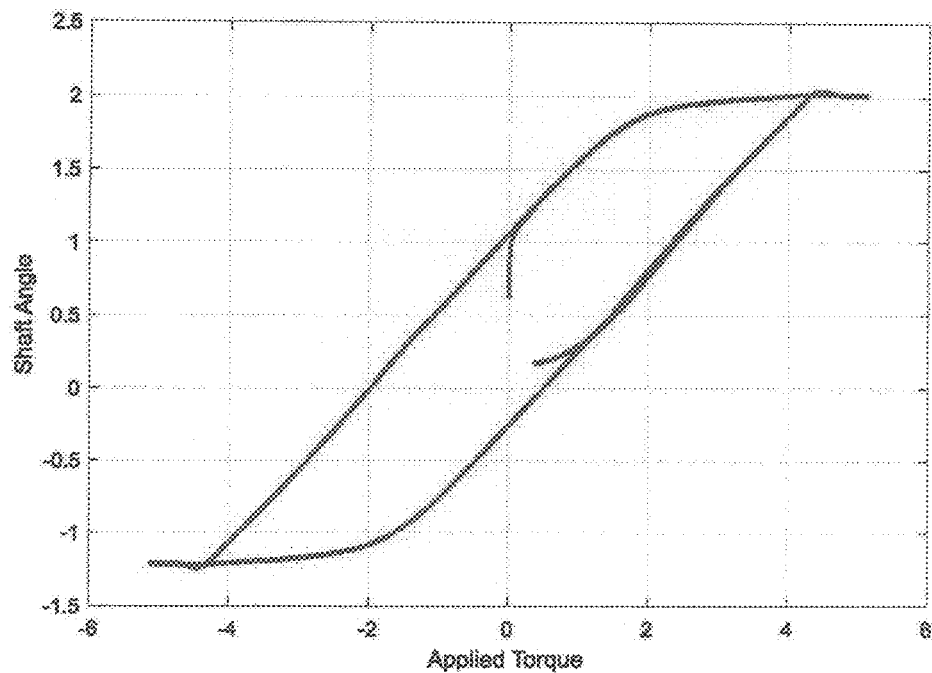
FIG. 14 is an example of a graph of steering shaft angle against applied torque for the exemplary arrangements of the disclosure referred to above.
Figure 15:
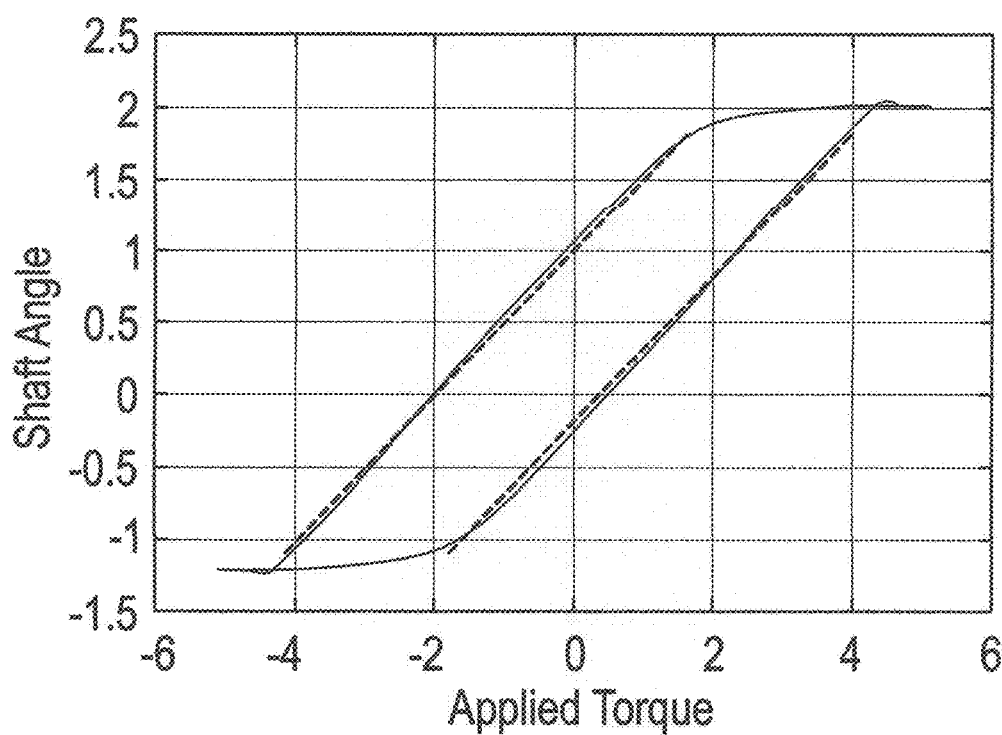
FIG. 15 is an example of a graph of steering shaft angle against applied torque illustrating the derivation of average angle/torque gradient and hysteresis width.

FIG. 14 shows a parametric plot of the measured handwheel (steering shaft) angle against the applied torque. The plot shows a hysteresis loop due to the friction within the lock mechanism and the dynamic effects of the handwheel and other mechanical parts.

Diagnostics

Figure 16:
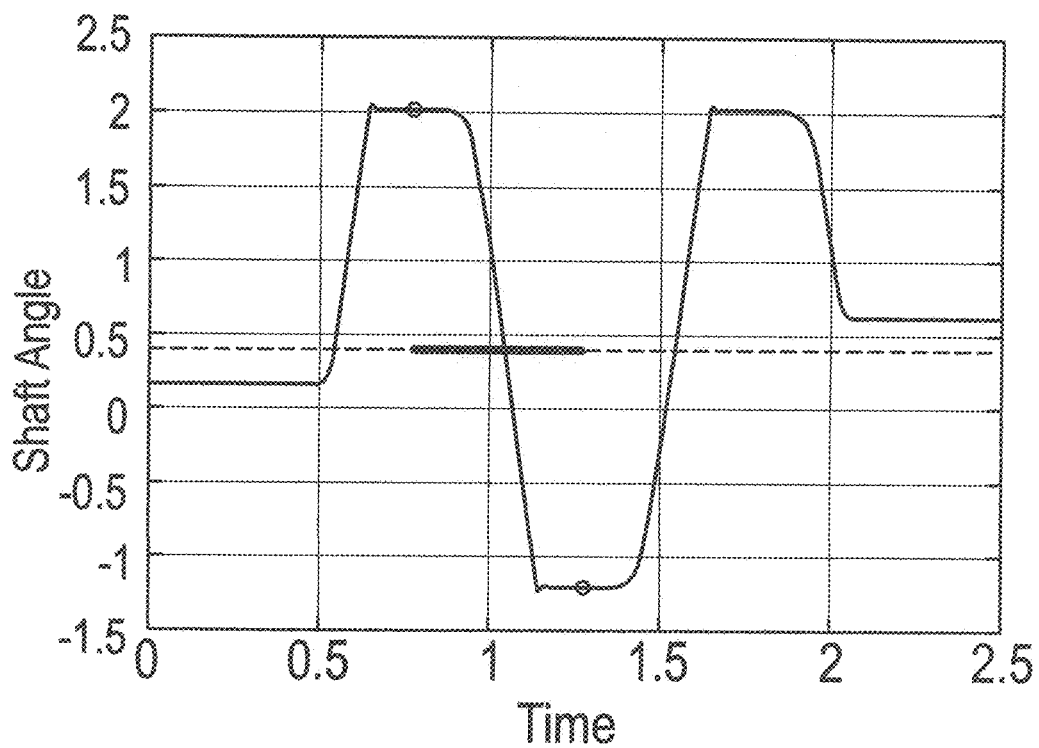
FIG. 16 is an example of steering shaft angle against time illustrating an example of a check on maximum torque and illustrating how the measured shaft angle can be used to determine the centre position of a steering lock.
Figure 17:
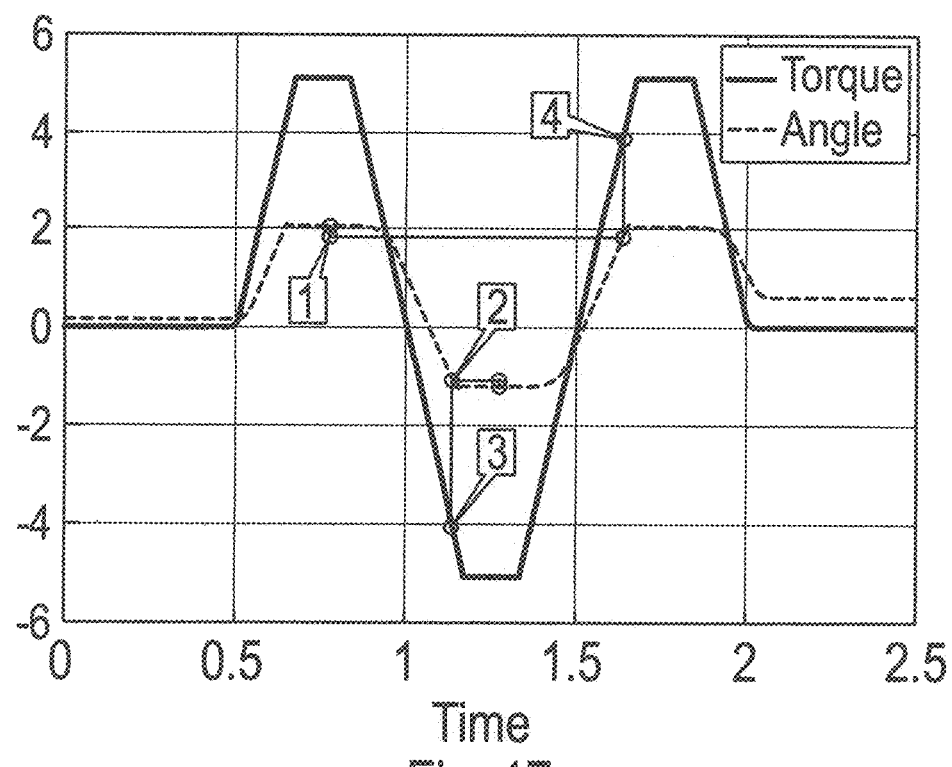
FIG. 17 is an example of a graph of applied torque and steering shaft angle against time, illustrating a check on the width of the hysteresis band.

The measurements from the test profile can be assessed to check several attributes, Angle Bound Check The minimum and maximum angles can be found and used to estimate the centre angle of the lock. FIG. 16 shows a graphical representation of the check. The minimum and maximum angles can be found. These angles can be used to:

Check the range is as expected.

Find the central position of the lock. This is expected to be a fixed angle from the straight-ahead position of the handwheel. A stored calibration (offset) can be used to check that the absolute angle of the handwheel is measured correctly. Alternatively, it can be used to initialise the angle measurement at the start of the journey.

Check that the angle measurement reaches a constant level with low noise.

Check Maximum Torque to Reach Stop

The level of applied torque can be checked at each end of the lock travel. For example, the torque when the stall condition is detected (points 6 and 11 in FIG. 13) can be checked against a pre-determined level. The maximum and minimum can be compared to check for an offset in the applied torque. If the expected angle is not achieved with the highest applied torque in or both directions, then this may indicate that the torque is not being applied in the expected fashion.

Alternatively, the angle/torque gradient (below) can be used to infer the maximum torque for a given angle.

An incorrect maximum torque level will indicate a problem with the torque generation, the lock spring or excessive lock friction, Angle/Torque Gradient The angle/torque gradient of the lock can be determined by considering FIG. 14. The gradient should be determined for the torque ramp-up and torque ramp-down cases separately. At least two points should be measured. These should be points that can be determined with good repeatability. For example, referring to the time-history in FIG. 13, the point at which movement is first detected and the point at which stall is detected (points 5 & 6 for the falling ramp and points 10 & 11 for the rising ramp) can be used.

The results can be checked against the expected gradient, which is related the compliance of the torsion spring but will also include torque needed to accelerate the handwheel and overcome variations in friction. If one or both measurements are not as expected, then this may indicate a problem with the applied torque generation, or the spring in the lock.

Check Width of Hysteresis Band

The width of the hysteresis band can be assessed to check the level of friction and lash in the lock. Alternatively, the band can be estimated from the difference in applied torque at specific points on the curve. Since the exact centre angle of the lock may not be known, a procedure shown in FIG. 17 may be required. This uses the same excitation as the previous checks.

Step 1: Determine the maximum angle and a value that lies in the linear region of the torque/angle characteristic.

Step 2: Determine the corresponding angle at the opposite end stop using a priori information about the angular distance between end stops.

Step 3: When the angle near the end stop is achieved, capture the value of applied torque.

Step 4: When the angle determined in Step 2 is achieved on the next cycle, capture the level of applied torque.

The difference between the two captured values is used as an indicator of friction torque in the lock. The estimated friction can be compared with a pre-stored value. If the friction is outside expected bounds then it may indicate a problem with the lock mechanism or excessive friction in the feedback torque generator.

Two Lane Control System

Angle Measurement

It is likely that the handwheel actuator will have more than one manner of measuring or inferring the column angle. The actuator can be configured to form an "array" of measurement sources. In normal operation, the signal array will be used to initialise and monitor the operation of the angle measurement subsystem: different measurement sources will be compared to check for the correctness of the measurement in real-time. It is likely that the column angle measurement array will include an arrangement to assure that the column angle can be correctly measured and diagnosed after a first fault in the measurement system.

A further aspect of providing multiple angle measurement sources may include multiple angle measurement processing systems, in which independent processing subsystems (typically a microcontroller) determine the angle based on some or all of the signals from the overall array. These independent processing systems may then either check each other and/or be checked by a further processing unit (that may not be included in the TFU ECU).

As described above with respect to the angle bound check, the lock system may provide part of the initialisation routine for the signal array since the column is locked at a known angle before the ECU 50 is powered-down, and a fixed output can be obtained at power-up.

The tests described above can check multiple angle measurement sources simultaneously, either by directly checking individual signals, or by checking the output from the overall array. The tests can be implemented in more than one processing unit, provided that the applied torque is shared between the processing units.

Applied Torque

The handwheel actuator may contain more than one control path for setting the applied torque. For example, an actuator may include a motor with multiple sets of windings that can be independently controlled by different processing subsystems, or multiple motors each with its own control electronics and processing subsystem. In this case the tests described above can be applied either by coordinating the processing units to each provide a proportion of the required applied torque at the same time, or by repeating the tests with each processing unit taking turns to provide the required applied torque in sequence.

A further elaboration can be made by adding an additional test in which the multiple actuators work in opposition to produce a net zero torque and the angle is monitored to check that no unexpected movement takes place.

The disclosure is not restricted to the details of the foregoing arrangements.

The invention claimed is:

1. A steering column assembly comprising:
an elongate rotatable steering column configured at one end for attachment of a steering member and being displaceable along its longitudinal axis between a withdrawn, stowed position in which the steering function of the steering column is inhibited and an extended, deployed position in which the steering function of the steering column can be enabled;
a displacement motor for displacing the steering column between the stowed and deployed positions;
a torque feedback motor connected to the steering column and by which the steering column is rotatable;
an engagement mechanism which is engaged when the steering column is in the stowed position and which limits an angular displacement of the steering column to a predetermined value, wherein the engagement mechanism comprises a biasing member that biases the steering column towards a predetermined position; and
a control unit configured to control the operation of the displacement motor and torque feedback motor and to selectively inhibit and enable the steering function of the steering column.

2. A steering column assembly as claimed in claim 1, wherein the engagement member engages with a portion of the steering column when the steering column is in the stowed position.

3. A steering column assembly as claimed in claim 2, wherein the engagement member engages with an inner end of the steering column.

4. A steering column assembly as claimed in claim 3, wherein the engagement member has a movable portion which is complementarily-shaped with the inner end of the steering column.

5. A steering column assembly as claimed in claim 4, wherein the movable portion is spring-biased towards the inner end of the steering column.

6. A steering column assembly as claimed in claim 4, wherein the movable portion is rotatably mounted.

7. A steering column assembly as claimed in claim 6, comprising a spring member configured to apply a counter-torque to the movable portion in response to rotation of the movable portion.

8. A steering column assembly as claimed in claim 7, wherein the spring member is configured to apply a counter-torque to the movable portion in response to rotation of the movable portion in either direction.

9. A steering column assembly as claimed in claim 2, further comprising an elongate housing within which the steering column is mounted and an aperture in the elongate housing through which a portion of the steering column is exposed, the engagement member engaging with the steering column through the aperture in the elongate housing when the steering column is in the withdrawn, stowed position.

10. A steering column assembly as claimed in claim 9, further comprising biasing member which biases the engagement member in a direction through the aperture in the elongate housing when the steering column is in the withdrawn, stowed position.

11. A steering column assembly as claimed in claim 9, wherein the engagement member comprises a pawl member.

12. A steering column assembly as claimed in claim 9, comprising a toothed portion which rotates with the steering column and which is configured to be aligned with the aperture in the elongate housing when the steering column is in the withdrawn, stowed position and which is engageable with the engagement member.

13. A steering column assembly as claimed in claim 12, wherein the toothed portion comprises a toothed collar mounted on the steering column.

14. A steering column assembly as claimed in claim 12, further comprising a compliant member which permits rotation of the steering column through a predetermined angle when the engagement member engages the steering column through apertures in the elongate housing.

15. A steering column assembly as claimed in claim 14, wherein the compliant member comprises a resiliently deformable member which is secured to, and rotates with, the steering column, and on which the toothed portion is mounted.

16. A steering column assembly as claimed in claim 2, wherein the steering column assembly further comprises a steering member attached to the steering column and wherein the engagement member is configured to engage with a portion of the steering member when the steering column is in the withdrawn, stowed position.

17. A steering column assembly as claimed in claim 16, wherein the steering member comprises an annular rim, a central hub and one or more spokes extending between the annular rim and the central hub and wherein the engagement member is configured to engage with a spoke of the steering wheel.

18. A steering column assembly as claimed in claim 17, wherein the engagement member comprises a recess configured to receive a spoke of the steering wheel.

19. A steering column assembly as claimed in claim 18, further comprising a vehicle dashboard with respect to which the steering column is longitudinally displaceable and wherein the position of the recess is fixed with respect to the vehicle dashboard.

20. A steering column assembly as claimed in claim 19, wherein the recess is defined between two spaced apart members.

21. A steering column assembly as claimed in claim 20, wherein each spaced apart member further comprises an engagement portion which is spring-biased towards the recess.

22. A steering column assembly as claimed in claim 1, further comprising an angular detector for detecting the angular position of the steering column and generating an electric signal which is a function of the angular displacement.

23. A steering column assembly as claimed in claim 22, further comprising an actuator unit for initializing and checking the function of a steering angle measurement at engagement of the engagement member with, and/or disengagement from, the steering column.

24. A steering column assembly as claimed in claim 1, further comprising a measurement sensor for determining the torque applied to the steering column when the steering column is in the withdrawn, stowed position.

25. A steering column assembly as claimed in claim 24, further comprising a processing system for analyzing of one or more of the torque applied to the steering column, the angular displacement of the steering column and an angular velocity of the steering column, when the steering column is in the withdrawn, stowed position.

* * * * *